G. CUMMINGS.
CYCLE FORK.
APPLICATION FILED SEPT. 12, 1911.
1,014,285.
Patented Jan. 9, 1912.
2 SHEETS—SHEET 1.
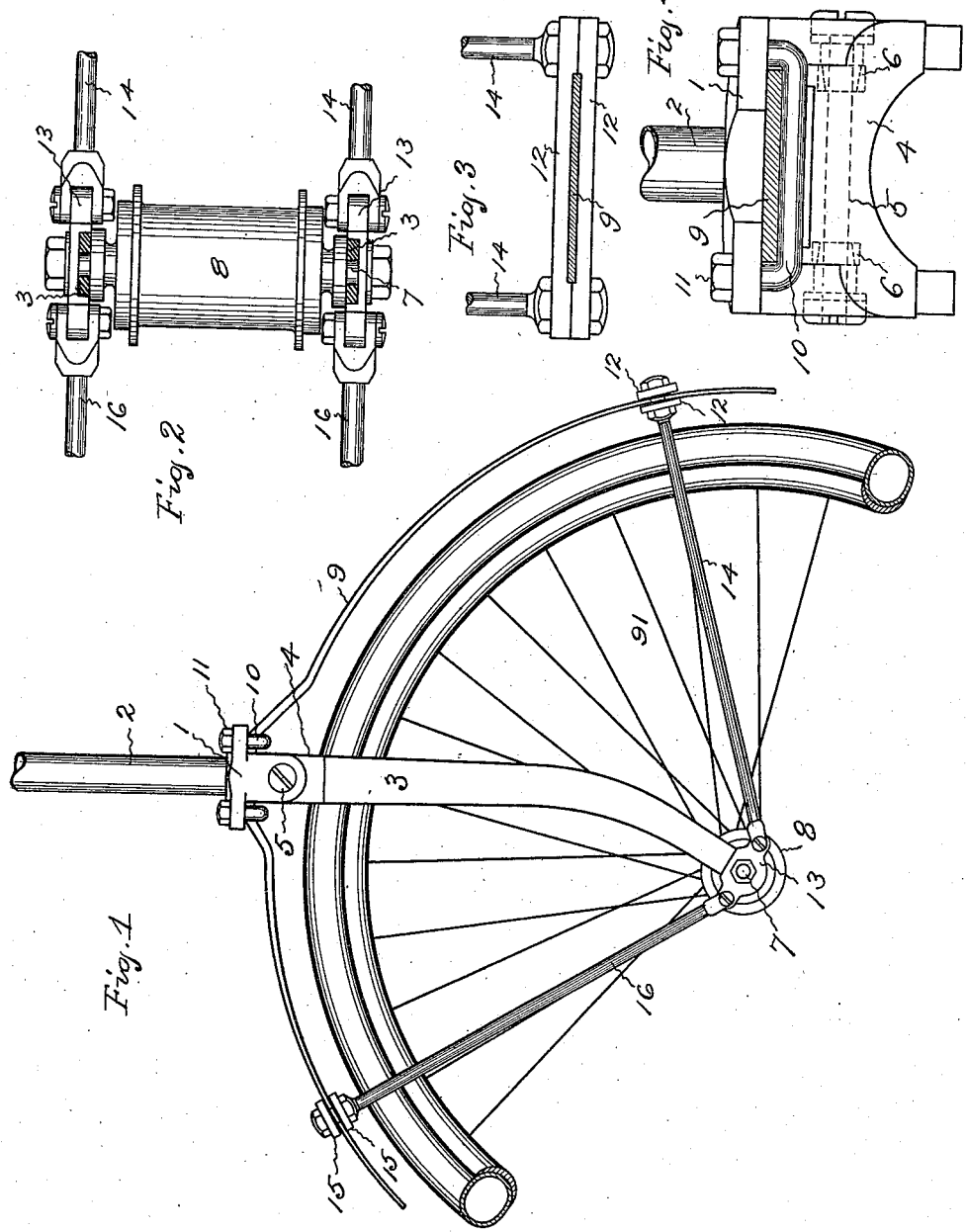

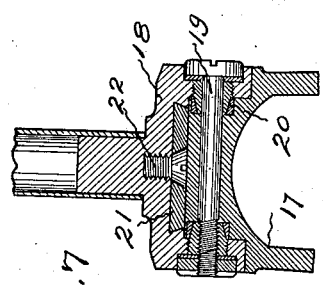
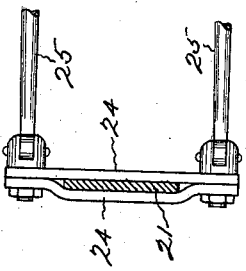
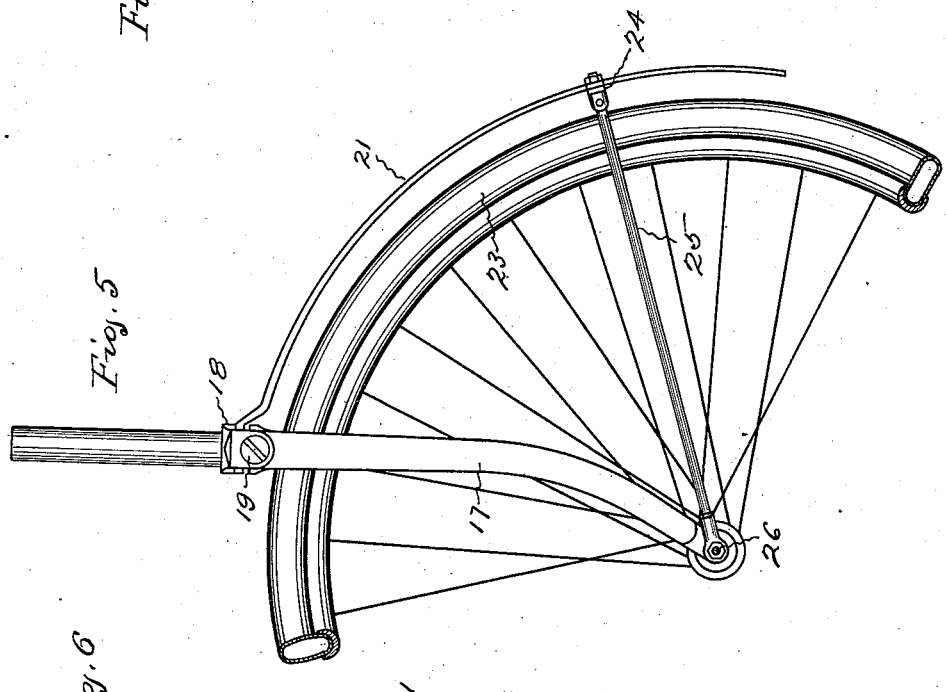

UNITED STATES PATENT OFFICE.

GEORGE CUMMINGS, OF DAYTON, OHIO, ASSIGNOR OF ONE-HALF TO ELMER M. LEWIS, OF DAYTON, OHIO.

CYCLE-FORK.

1,014,285. Specification of Letters Patent. Patented Jan. 9, 1912.

Application filed September 12, 1911. Serial No. 648,989.

*To all whom it may concern:*

Be it known that I, GEORGE CUMMINGS, a citizen of the United States, residing at Dayton, in the county of Montgomery and State of Ohio, have invented a new and useful Improvement in Cycle-Forks, of which the following is a specification.

This invention relates to the construction of a front or steering wheel fork for bicycles and motor-cycles.

The object of the invention is to provide for such cycles a simple and cheap fork which is very strong and yet quite elastic so that it will relieve the machine and rider of shocks and jars incident to the unevenness and minor obstructions of the road over which the machine may be ridden, and also to so arrange the parts that the spring will serve as a guard to protect the rider from dust and dirt thrown up by the front wheel while the machine is being ridden, and may have its elasticity readily adjusted to suit the weight of the rider.

The invention resides in a construction having a fork that at one end is pivoted to the steering crown, so that it can oscillate forward and backward, and that at the other end is secured to the front wheel axle, said organization also having a long wide leaf spring which conforms to a portion of the wheel tire, and that at one point is secured to the steering crown, and at another point is connected with the front wheel axle, whereby the oscillations of the fork incident to the vibrations of the wheel as it runs over the road, are restrained and absorbed by the spring which also serves as a mud guard.

Figure 1 of the accompanying drawings shows a side elevation of a portion of a cycle wheel and a spring fork which embodies a form of the invention that is more particularly designed for motor-cycles. Fig. 2 shows on larger scale a plan of the steering wheel hub and the means connecting the lower ends of the fork and the ends of the spring rods, with the wheel axle. Fig. 3 shows the method of connecting the spring with the spring rods. Fig. 4 shows a front view of the crown and the means for connecting thereto the fork-yoke and the spring. Fig. 5 shows a side elevation of a portion of a wheel and a fork which embodies a form of this invention that is more particularly designed for bicycles. Fig. 6 shows a front view of the fork and crown illustrated in Fig. 5. Fig. 7 shows a vertical section on larger scale of the crown and the upper end of the fork and spring connected therewith. Fig. 8 shows a method of connecting the spring with the spring-rods.

The steering crown 1 is secured in the common manner to the stem 2 which is designed to pass loosely through the frame head and to be connected with the steering handle-bar. The upper ends of the fork-tubes 3 of common design are brazed or otherwise secured by the usual method to the fork-yoke 4, and this yoke is hinged to the crown by the pivot screw 5, suitable bearings 6 being arranged in the crown to reduce the friction to a minimum. The lower ends of the fork-tubes are connected with the axle 7 by the ordinary means. The hub 8 of the wheel 91 is mounted upon the axle in the usual way.

The broad flat leaf spring 9, which is shown in Fig. 1, is fastened to the crown by the clamp bars 10 and nuts 11. This spring curves rearwardly and downwardly adjacent to the wheel tire and is of sufficient width to form a guard which prevents mud and dirt that is picked up by the wheel from being thrown onto the rider. The lower rear end of this spring passes between and is held by a pair of clamp plates 12. These clamp plates are connected with a plate 13, mounted on each end of the axle, by a rod 14 on each side of the wheel. In the form first shown, the spring also extends forwardly and curves over the wheel in front of the crown. Near its front end the spring passes between a pair of clamp plates 15 that are connected by rods 16 with the plates 13 on the axle ends. This form of spring fork is particularly adapted for motor-cycles. When the wheel encounters an obstruction or passes over an uneven surface of the road, the fork yields, swinging on its pivotal connection with the crown, and this swinging of the fork is resisted by the rods which give according to the resilience of the spring ends. Thus, while the weight of the rider is practically supported by the fork, and the turning of the wheel for steering is accomplished through the fork, the shocks and jars incident to the vibrations of the wheel in encountering obstructions and passing over unevennesses of the road, are absorbed by the leaf spring ends, which also serve as mud guards. To adjust the supporting tension of the springs to the weight of the rider, the clamps may be loosened and the ends of the rods may be moved up or down along the leaf spring ends until the desired rigidness is obtained.

In the second form of the invention illustrated, which is perhaps better adapted for bicycles, the upper end of the fork 17 is hinged to the crown 18 by the pivot screw 19. Suitable bearings 20 are arranged between the parts to reduce the friction in this case as in the former. In this adaptation of the invention, the upper end of the long flat spring 21 terminates at the crown to which it is secured by passing it into a dove-tail mortise therein, and holding it there by a screw 22 (Fig. 7). This spring curves rearwardly and downwardly over the wheel, and is of a width substantially the same as, or preferably a little wider than, the diameter of the tire 23. This spring near its lower end is clasped by clamp plates 24. These clamp plates are connected by rods 25 with the axle 26 outside of the lower ends of the fork, which are also connected with the axle. In this form the yielding of the supporting and steering fork is controlled by the mud guard spring which is strong yet resilient.

The invention claimed is:

1. In a cycle, the combination of a steering crown, a fork with its upper end pivoted to the crown so that the fork may swing forward and backward, an axle attached to the lower end of the fork, a leaf spring secured at one point to the crown, and rods connecting said spring at another point with said axle.

2. In a cycle, the combination of a steering crown, a fork with its upper end pivoted to the crown so that the fork may swing forward and backward, an axle attached to the lower end of the fork, a leaf spring secured at one point to the crown, and rods connecting both ends of said spring with said axle.

3. In a cycle, the combination of a steering crown, a fork with its upper end pivoted to the crown so that the fork may swing forward and backward, an axle attached to the lower end of the fork, a leaf spring secured intermediate its ends to the crown and curving forwardly and backwardly therefrom, and rods connecting the ends of the spring with the axle.

4. In a cycle, the combination of a steering crown, a fork with its upper end pivoted to the crown so that the fork may swing forward and backward, an axle attached to the lower end of the fork, a leaf spring extending forward and backward of the crown, clamp bars and nuts fastening the spring intermediate its ends to the crown, rods connected with the axle, and clamp plates connecting the rods with the spring near its ends.

5. In a cycle, the combination of a steering crown, a fork with its upper end pivoted to the crown so that the fork may swing forward and backward, an axle fastened to the lower end of the fork, a spring conforming to the contour of the wheel and of a width equal to substantially the width of the tire, said spring at one locality being secured to the crown, and at another being connected with the axle.

6. In a cycle, the combination of a steering crown, a wheel axle, a fork attached to the axle at one end and pivoted to the crown at the other end, a leaf spring fastened intermediate of its ends to the crown, and means connecting the spring near its ends with the axle.

7. In a cycle, the combination of a steering crown, a fork with its upper end pivoted to the crown, an axle attached to the lower end of the fork, a leaf spring clamped intermediate of its ends to the crown, clamp plates adjustably secured to the spring near its ends, and rods connecting the clamp plates with the axle.

8. In a cycle, the combination with the steering crown and the steering-wheel axle, of a fork hinged at one end to the crown so as to swing forward and backward, and fastened at the other end to the axle, and a curved leaf spring secured at one locality to the crown, and connected at another locality with the axle.

GEORGE CUMMINGS.

Witnesses:
J. B. Parmelee,
James C. Burt.

Copies of this patent may be obtained for five cents each, by addressing the "Commissioner of Patents, Washington, D. C."